Jan. 20, 1959  J. F. NELSON ET AL  2,869,738
APPARATUS FOR GATHERING AND SUSPENDING TIED BUNDLES
OF WIRE OR THE LIKE IN ALINED GROUPS
Filed Jan. 11, 1955  5 Sheets-Sheet 1
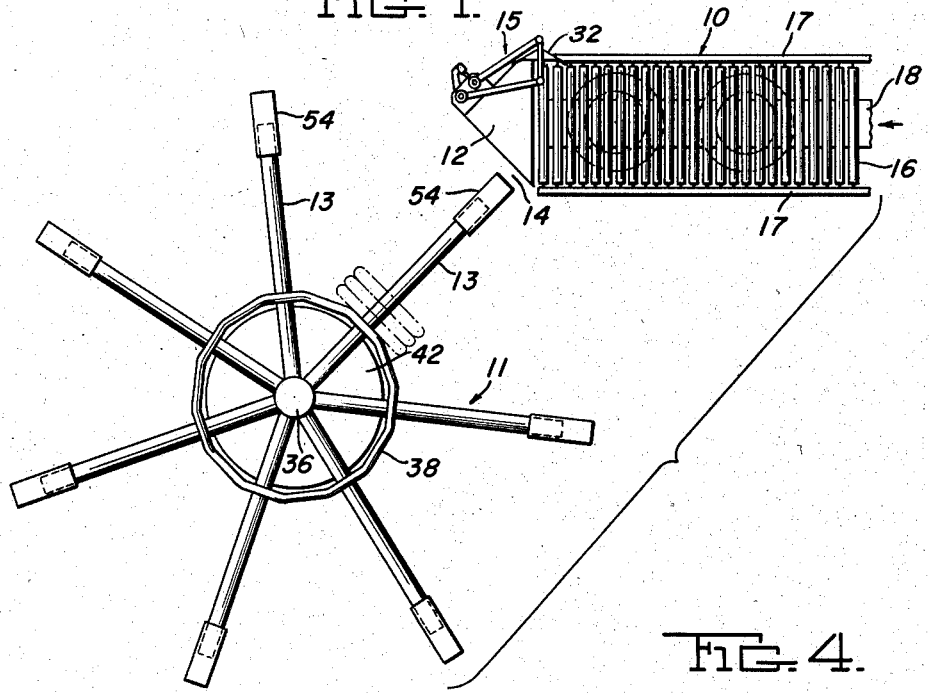
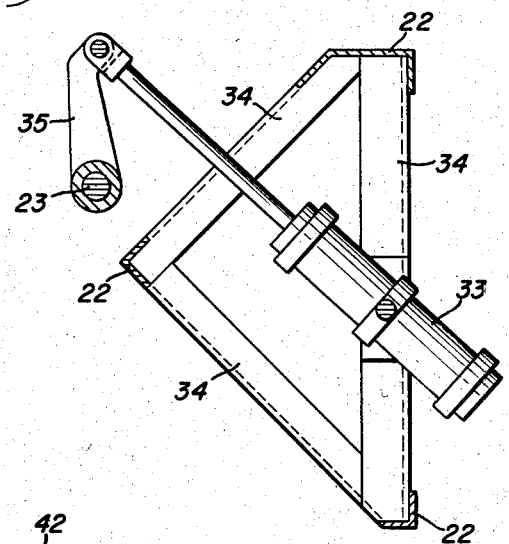
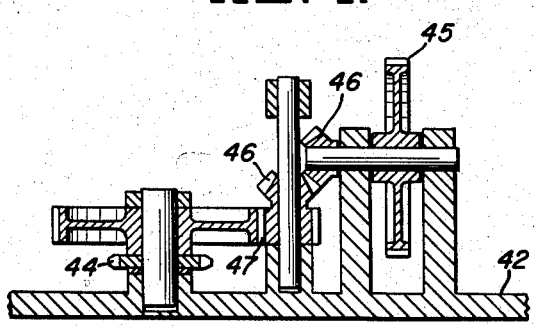
INVENTORS:
JOHN F. NELSON,
SCOTT D. WARNER and
ROBERT G. WHITNEY,
BY: Donald G. Dalton
their Attorney.

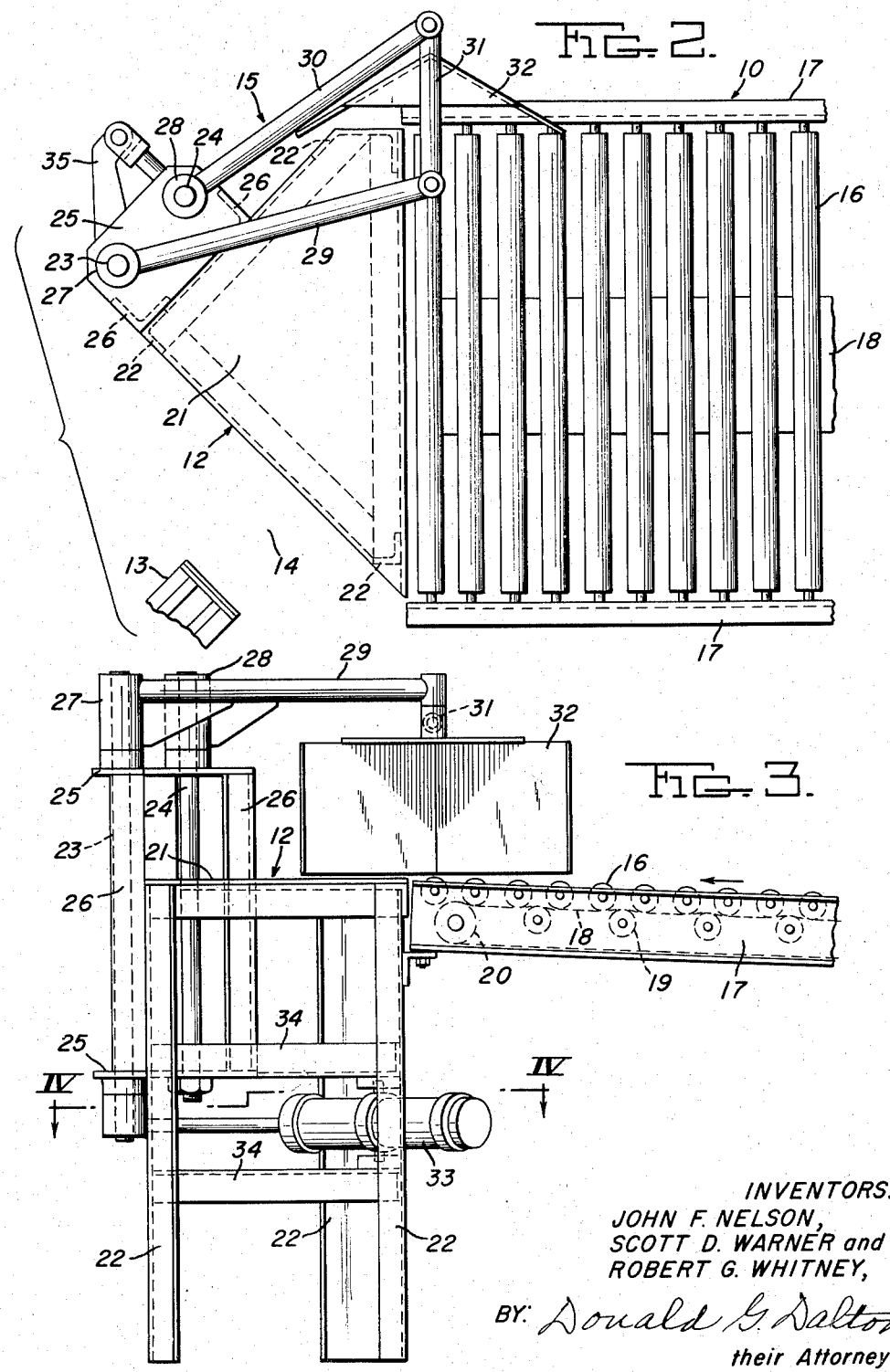

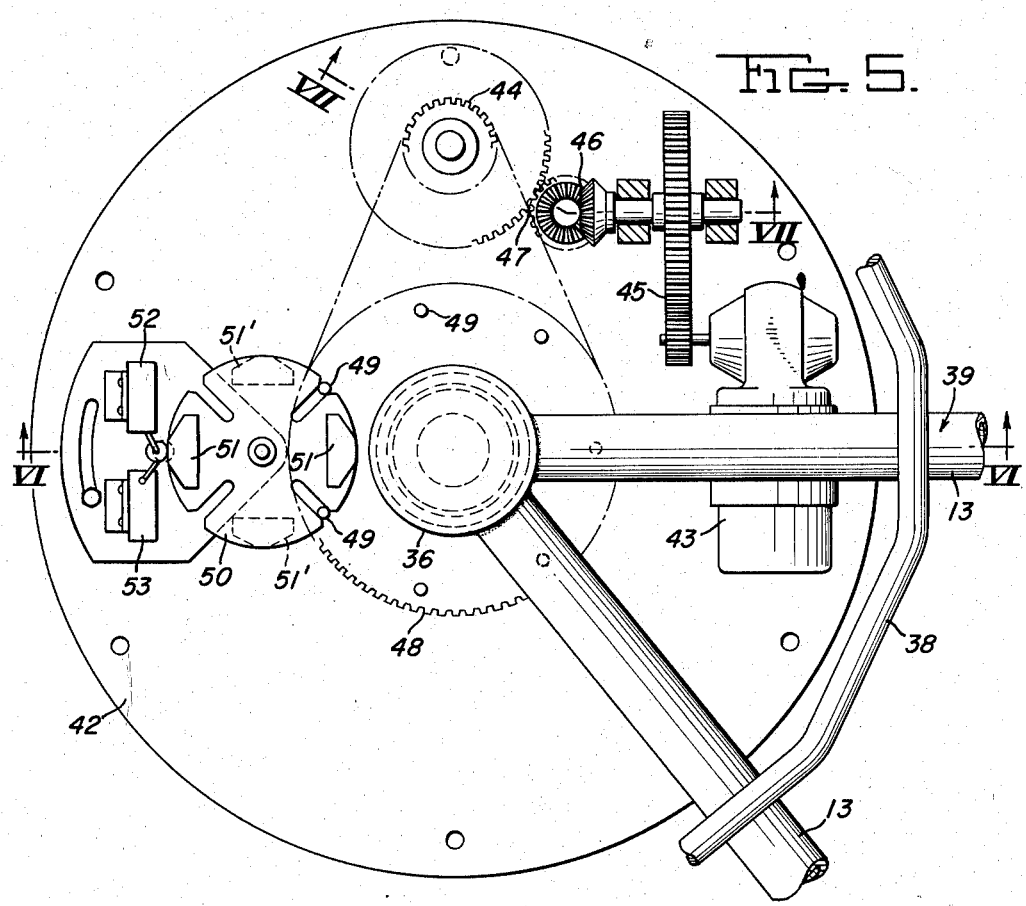
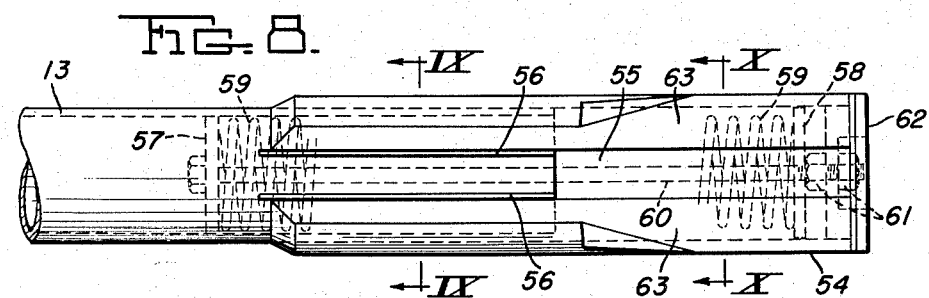
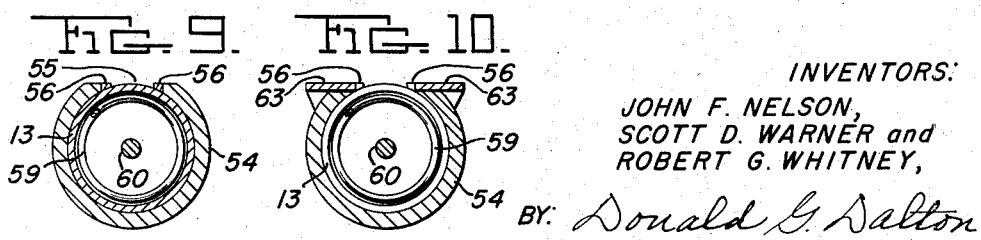
INVENTORS:
JOHN F. NELSON,
SCOTT D. WARNER and
ROBERT G. WHITNEY,
BY: Donald G. Dalton
their Attorney.

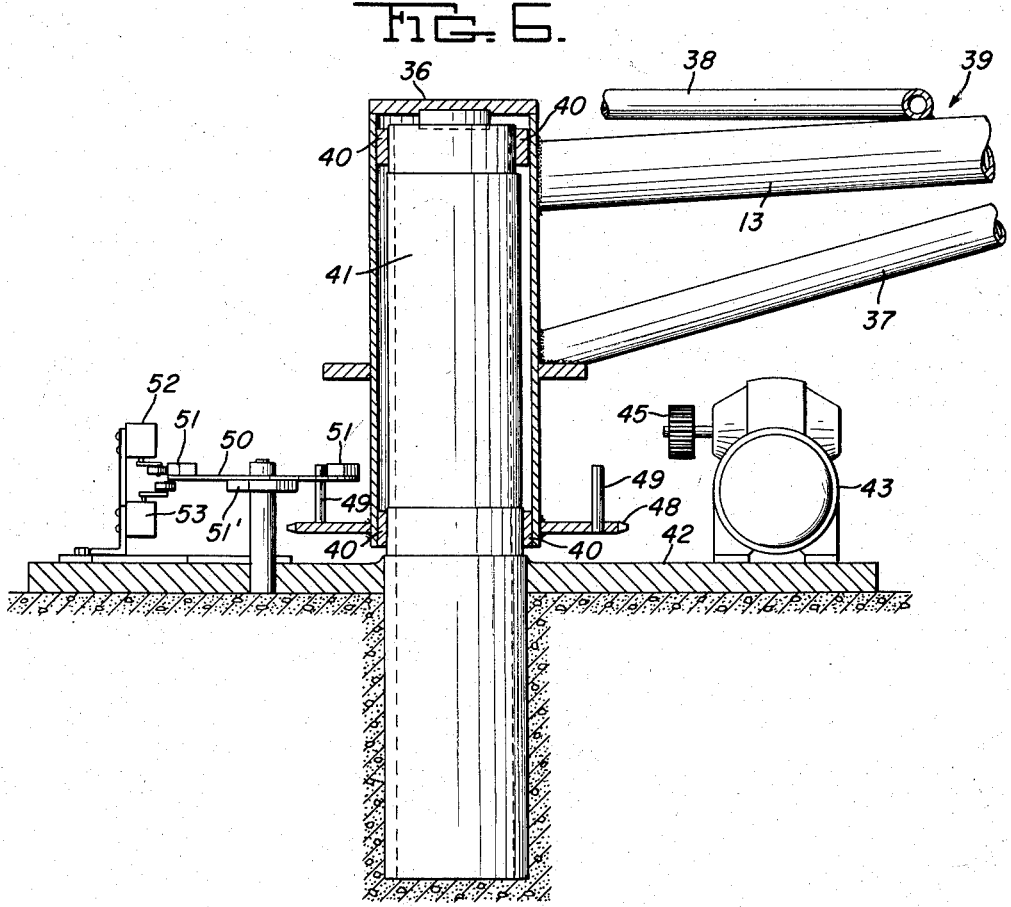
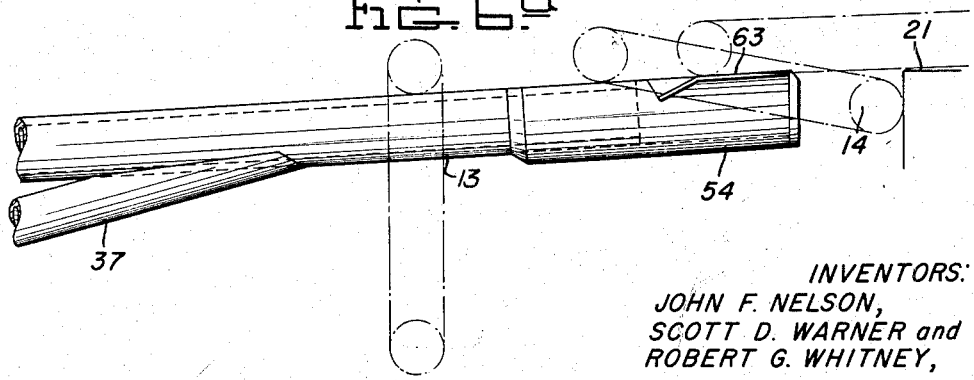

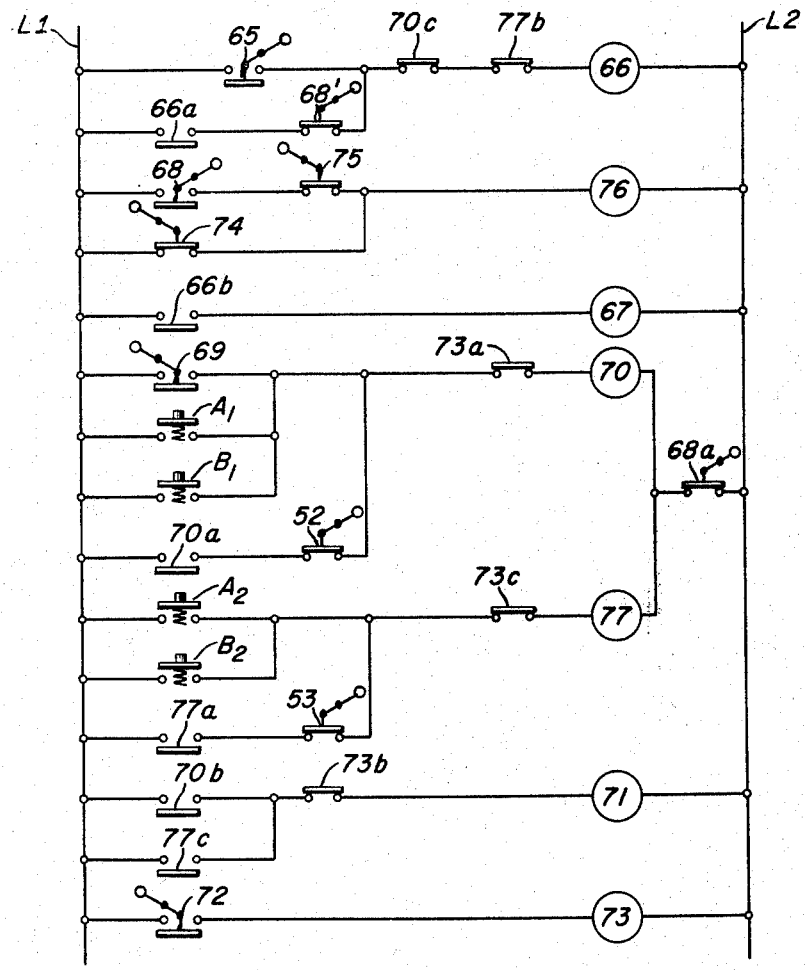

2,869,738

APPARATUS FOR GATHERING AND SUSPENDING TIED BUNDLES OF WIRE OR THE LIKE IN ALINED GROUPS

John F. Nelson, Concord, Scott D. Warner, Pittsburg, and Robert G. Whitney, Concord, Calif., assignors to United States Steel Corporation, a corporation of New Jersey Application January 11, 1955, Serial No. 481,054

10 Claims. (Cl. 214—8)

This invention relates generally to apparatus for handling annular articles and, in particular, to means for transposing such articles from a horizontal position lying on a conveyor, to a vertical position suspended from a cantilever supporting arm, in order to facilitate the pick-up of a group of articles by a ram-lift truck for transport.

Various articles in the form of an annulus require handling in groups as an incident to their manufacture or shipment. One example is the coils or bundles into which wire is formed by winding on drawing blocks. Such coils are usually placed on a conveyor with their axes vertical and strapped or tied at a plurality of points around their circumference to compact the turns of of the coil and form a bundle which can readily be handled. It has been the practice heretofore to lift the tied coils by hand from the conveyor and stand them on edge in a row on the floor for pick-up by a ram-lift truck and movement to storage or a shipping conveyance.

We have invented novel apparatus for performing this function, including mechanical means for removing coils from a conveyor and a cantilever supporting arm cooperating therewith in gathering a plurality of coils in alinement so that they may be picked up therefrom together. The arm is one of a plurality radiating from a common center in the form of a rotary spider or coil rack, each arm of which is adapted successively to receive a group of coils from the conveyor. A slide table extends from the conveyor toward one of the spider arms but is spaced from the path of the ends of the arms. A coil pusher is mounted for oscillation forth and back over the table to move coils successively from the conveyor onto one of the arms. The arms are provided with telescoping extensions at their outer ends and a coil stop adjacent their inner ends.

A complete understanding of the invention may be obtained from the following detailed description and explanation which refer to the accompanying drawings illustrating the present preferred embodiment. In the drawings:

Figure 1 is a plan view showing the conveyor, slide table, coil pusher and spider, certain parts being omitted;

Figure 2 is a portion of Figure 1 on an enlarged scale;

Figure 3 is an elevation corresponding to Figure 2;

Figure 4 is a horizontal section along the plane of line IV—IV of Figure 3;

Figure 5 is a plan view of the spider with parts omitted for clearness;

Figure 6 is a section, with parts in elevation, taken along the plane of line VI—VI of Figure 5;

Figure 6a shows the outermost end of one of the arms in elevation;

Figure 7 is a partial section taken along the plane of line VII—VII of Figure 5 showing the spider drive;

Figure 8 is a partial plan view to enlarged scale showing the telescoping extension at the end of the spider arms;

Figures 9 and 10 are sections therethrough taken, respectively, along the lines IX—IX and X—X of Figure 8; and Figure 11 is a diagram of the electrical control circuit.

Referring now in detail to the drawings and, for the present, to Figure 1, a roller conveyor 10 delivers tied coils of wire in the direction of the arrow. A spider or coil rack 11 having arms 13 adapted to receive the coils and gather them in groups, is offset from the longitudinal axis of the conveyor. A slide table 12 extends from the discharge end of the conveyor toward the spider but is spaced from the path of the ends of the arms 13 of the spider by a gap 14 slightly greater than the width of a section through one side of the coil. A pusher 15 serves to transpose the coils successively from the conveyor, across the table and onto a spider arm in a manner which will be explained in more detail later.

Certain features of coil rack 11 are described and claimed in our copending application Serial No. 659,591, filed May 16, 1957, which is a division hereof.

Conveyor 10 is of conventional construction. The rollers 16 thereof are journaled in side rails 17. Except for the last one in the direction of travel, they are frictionally driven by a traction belt 18 (see Figures 2 and 3) trained over bearing and guide pulleys 19 and 20, journaled in rails 17, and a driving pulley (not shown).

Table 12 comprises a triangular top plate 21 supported by legs 22, the plate being substantially flush with the top of the last roller of conveyor 10. Vertical shafts 23 and 24 are journaled in spaced horizontal plates 25 carried by angles 26 attached to one side of the table. Sleeves 27 and 28 are secured to the upper ends of shafts 23 and 24, respectively. Arms 29 and 30 carried by the sleeves extend toward the conveyor 10. A link 31 pivoted to the ends of arms 29 and 30 carries a V-shaped sweep 32, fabricated from plates, adapted to engage a coil on the conveyor and push it across table top 21.

Pusher 15 is actuated by a fluid-pressure cylinder-and-piston 33 trunnioned horizontally between stretchers 34 of table 12, the piston rod of which is pivoted to a crank 35 secured to shaft 23 (see Figure 4). Reciprocation of the piston rod oscillates the crank and shaft 23 whereupon arm 29 causes the sweep and its supporting arm 30 to move forth and back across the table.

Referring now more particularly to Figures 5 through 7, the arms 13 of spider 11 are pipe lengths constituting cantilevers extending radially from a hub 36. The arms are generally horizontal but slope downwardly from their outer ends which are flush with table top 21, toward the hub, and are braced by struts 37. A pipe loop 38 coaxial with the hub is carried by arms 13 and serves as a stop for coils placed thereon and sliding downwardly to the position indicated at 39. The hub is journaled on vertically spaced bearings 40 carried by a post 41 fixed centrally of a base plate 42 and extending upwardly and downwardly therefrom.

Spider 11 is driven step-by-step to bring successive or alternate arms 13 into a position adjacent table 12 as shown in Figure 1. A gear motor 43 drives a sprocket 44 journaled on a stub shaft upstanding vertically from plate 42, through spur gears 45, bevel gears 46 and spur gears 47 (see Figures 5 and 7). These gears are mounted on shafts journaled in bearings carried by plate 42. Sprocket 44 drives a chain trained around it and a sprocket 48 fixed to the lower end of hub 36. Sprocket 48 has vertical pins 49 spaced circumferentially thereof adapted to actuate a Geneva disc 50 journaled on a stub shaft upstanding from plate 42. Disc 50 has cam blocks 51 and 51' thereon adapted to actuate limit switches 52 and 53 controlling gear motor 43.

Each arm 13 has an extension 54 slidable on the outer end thereof. In the illustrated embodiment, these extensions are sleeves telescoped on the pipe lengths of which arms 13 are composed. Each of the sleeves has a longitudinal slot 55 therethrough and ribs 56 of metal are deposited on the arms adjacent the sides of the slots, forming splines which prevent rotation of the sleeves yet permit sliding movement thereof along the arms. An abutment disc 57 is fixed in each arm at a point inwardly from the end thereof. A similar disc 58 is loose in each sleeve 54 adjacent the outer end thereof. A coil spring 59 is compressed between the discs and tends to move the sleeve outwardly of the arm to the extent permitted by a through bolt 60 the head of which bears on disc 57. The threaded end of the bolt is secured by nuts 61 to a plug disc 62 fixed in the end of the sleeve.

Flat bars 63 extend along the edges of the slots 55, partway of the length of sleeves 54, to provide an extended area of contact with the leading side of the coils as they are pushed across table 12 toward one of the arms 13.

It will be apparent from the foregoing that coils advancing along conveyor 10 as shown in Figure 1, ultimately reach a position in which they are engageable by sweep 32. By properly timing the operation of cylinder-and-piston 33, coils arriving at such position are successively pushed from the conveyor across table top 21. The leading side of each coil is supported as a cantilever as it crosses gap 14 (see Figure 6a), being overbalanced by the greater weight of the portion of the coil remaining in contact with the table top. When the trailing side of a coil reaches the gap, however, it falls therethrough and the coil thereby becomes suspended on the arm and is pushed therealong toward stop 38 as subsequent coils are placed on the arm.

When one arm 13 is loaded to capacity with coils, spider 11 is rotated until the next arm or the second nearest one is adjacent table 12. Since there is an odd number of arms 13, indexing the spider through the angle between alternate arms will require two complete revolutions of the spider before all the arms have been loaded. If the spider is indexed through only the angle between adjacent arms, all the arms will have been loaded when a single revolution of the spider has been effected. The former affords better balancing of the spider when loaded.

A group of coils placed on one of the arms 13 as explained above, may be removed by a ram-lift truck at any point about the circumference of the spider. To this end, the truck is operated to cause its ram to penetrate the eyes of the coils. Since the ram length is only slightly greater than the total length of the group of coils, the truck must be advanced to engage and retract extension sleeve 54 along the arm until spring 59 goes solid. When the truck ram is then raised to lift the group of coils and backed away, the spring advances the extension immediately to provide the additional length of arm necessary to reduce the width of gap 14 and accommodate the diameter of the last coil of a group before it swings downwardly to suspended position on the arm.

In order to insure that the cycle of operations described above will occur in proper sequence, we provide the automatic control system shown in Figure 11. The several elements all of conventional construction, will be referred to and their function made clear during the following description of the operation of the electrical system.

The motor driving conveyor 10 is normally energized and the conveyor delivers wire coils successively to table 21. On reaching the table, the coil operates a switch 65 thereon which energizes a relay 66. This relay closes its own sealing circuit at contact 66a and at a contact 66b, energizes a solenoid valve 67 controlling cylinder-and-piston 33, to cause operation of sweep 32. As the piston advances from retracted position, a switch 68 opens contact 68a and closes contact 68b. When the piston reaches extended position it opens a limit switch 68' to deenergize relay 66 whereupon the valve restores itself to cause retraction of the piston.

The transfer of successive coils from table 21 to arm 13 continues until the lead coil operates a switch 69, closing the circuit of a relay 70. The relay closes its own sealing circuit at contact 70a and, at contact 70b, closes the circuit of a contactor 71 controlling motor 43. The spider 11 is then advanced until cam 51 operates limit switch 52 to open the circuit of relay 70. This deenergizes contactor 71 and stops motor 43.

When a lift truck is in loading position, a floor switch 72 will be closed to energize a relay 73. This relay opens a contact 73a to lock out the contactor 70. At contact 73b, it locks out contactor 71. While relay 70 is energized, furthermore, it prevents operation of sweep 32 by opening the circuit of relay 66 at contact 70c.

As a coil moves along conveyor 10, it opens a switch 74. As a coil is delivered onto table 21, it opens a switch 75. If a coil is on conveyor 10 in position to open switch 74 while switch 75 is opened by a preceding coil ready for delivery from table 21, the contactor 76 of the conveyor motor will be deenergized and the motor stopped.

For manual control of spider 11, there are two manual control stations, A and B. Each station consists of a push button operating two normally open contacts, $A_1$ and $A_2$, $B_1$ and $B_2$. One contact at each station will energize relay 70 and the other contact at each station will energize a relay 77. When relay 70 is energized, the spider will move for two positions unless it was moved only one position immediately previous to the energizing of relay 70. In that case, relay 70 will hold for only one position. Likewise relay 77 will hold for one position only immediately after spider 11 has moved two positions. If the spider had previously moved only one position, then relay 77 would hold for two positions.

Limit switch 52 deenergizes relay 70 only and limit switch 53 deenergizes relay 77 only. If continuous one-position operation is desired, the push buttons at stations A or B must be actuated alternately. Contacts on relays 70 and 77 will not be energized at the same time unless both the push buttons are operated. In this event, the spider will move two positions since it will be necessary for both limit switches 52 and 53 to clear their respective relays 70 and 77.

Limit switch 68a will prevent moving the spider unless the pusher is in a retracted position.

It will be apparent from the foregoing that the invention provides a simple yet efficient and largely automatic means for gathering a load of wire coils or bundles and holding them in position to be readily picked up by a ram-lift truck. Manual handling of the coils is eliminated and ample reserve coil-holding capacity is provided. Because of the automatic control only general oversight of the apparatus is needed and unskilled labor suffices for this purpose.

Although we have disclosed herein the preferred embodiment of our invention, we intend to cover as well any change or modification therein which may be made without departing from the spirit and scope of the invention.

We claim:

1. The combination with a rotatable spider having its axis substantially vertical and a plurality of substantially horizontally extending radial arms, of a horizontal conveyor adjacent but spaced from said spider and adapted to deliver a succession of annular articles lying flat on one side, a stationary table between the conveyor and spider lying substantially in a common plane with said conveyor and arms and adapted to slidably support said articles during passage from the conveyor to the spider, and article-pushing means mounted for travel forth and back across the table toward and from one of said arms pointing to the table, effective to slide the leading side of an article from the conveyor over the end of said one of said arms, all said arms being of a length affording a space between the end of an arm pointing toward the table and the edge of the table greater than the width of the section through one side of the article, whereby the leading side of an article being pushed across the table toward a spider arm pointing thereto is supported as a cantilever in crossing said space and the trailing side of the article falls downwardly through said space thereby disposing the article suspended in a vertical plane on the arm by engagement of said leading side therewith.

2. The combination defined in claim 1 characterized by a motor driving said conveyor and switches on said conveyor and table adapted to be actuated by articles passing thereover and effective to stop said motor.

3. The combination defined in claim 2 characterized by a switch actuated on operation of said pushing means effective to stop said motor when said conveyor switch is actuated.

4. The combination defined in claim 1 characterized by power means actuating said pusher means and a switch on said table adapted to be actuated by a passing coil and effective to energize said power means.

5. The combination defined in claim 4 characterized by a motor driving said spider and a switch actuated when said motor is energized, effective to prevent energization of said power means.

6. The combination defined in claim 1 characterized by a motor driving said spider and a switch positioned to be actuated when one of the spider arms is fully loaded, said switch controlling said motor.

7. The combination defined in claim 6 characterized by a floor switch adapted to be actuated by a vehicle when in position to unload articles from a spider arm, said switch being effective to prevent operation of said motor.

8. The combination with a rotatable spider having its axis vertical and including a plurality of radial cantilever arms extending substantially horizontally, of a conveyor adjacent the spider adapted to deliver a succession of annular articles with their axes substantially vertical, a stationary table between the conveyor and spider slidably supporting the articles while in transit from the former to the latter, and article-pushing means mounted to travel forth and back across said table, effective on movement in one direction to sweep the leading side of an article from the conveyor over the table and onto a spider arm, the edge of the table adjacent the spider being spaced from the path of the ends of the arms leaving the article suspended on the arm by its leading side, said article-pushing means including a vertical shaft, an arm projecting therefrom over said table and a sweep pivoted on said arm.

9. The combination defined in claim 8 characterized by a link pivoted to said last-mentioned arm, said sweep being secured to said link, a second vertical shaft spaced from the aforementioned shaft, and an arm on said second shaft pivoted to said link.

10. The combination defined in claim 9 characterized by a crank on one of said shafts and power means for oscillating said crank.

References Cited in the file of this patent
UNITED STATES PATENTS

| | | |
|---|---|---|
| 1,424,587 | Perry | Aug. 1, 1922 |
| 1,909,700 | Maurer | May 16, 1933 |
| 1,911,912 | Mathieson | May 30, 1933 |
| 2,558,503 | Young | June 26, 1951 |
| 2,589,899 | Vail | Mar. 18, 1952 |
| 2,635,767 | Burge et al. | Apr. 21, 1953 |